(12) United States Patent
Klatt et al.

(10) Patent No.: US 10,676,043 B2
(45) Date of Patent: Jun. 9, 2020

(54) REMOVABLE TOOL STORAGE COMPARTMENT

(71) Applicants: Jason Alan Klatt, Sioux Falls, SD (US); David Michael Johnson, Horseheads, NY (US); Nathan Dan Schiermeyer, Rock Rapids, IA (US)

(72) Inventors: Jason Alan Klatt, Sioux Falls, SD (US); David Michael Johnson, Horseheads, NY (US); Nathan Dan Schiermeyer, Rock Rapids, IA (US)

(73) Assignee: Maintainer Corp. of Iowa, Sheldon, IA (US)

( * ) Notice: Subject to any disclaimer, the term of this patent is extended or adjusted under 35 U.S.C. 154(b) by 0 days.

(21) Appl. No.: 16/193,464

(22) Filed: Nov. 16, 2018

(65) Prior Publication Data
US 2019/0152409 A1  May 23, 2019

Related U.S. Application Data

(60) Provisional application No. 62/587,562, filed on Nov. 17, 2017.

(51) Int. Cl.
| | | |
|---|---|---|
| *B60R 11/06* | (2006.01) | |
| *B60R 9/06* | (2006.01) | |
| *B60R 9/02* | (2006.01) | |
| *B60R 11/00* | (2006.01) | |
| *B60P 3/14* | (2006.01) | |

(52) U.S. Cl.
CPC .............. *B60R 11/06* (2013.01); *B60R 9/02* (2013.01); *B60R 11/00* (2013.01); *B60P 3/14* (2013.01); *B60R 9/065* (2013.01); *B60R 2011/004* (2013.01)

(58) Field of Classification Search
CPC .......... B60R 11/06; B60R 9/02; B60R 9/065; B60R 2011/004; B60P 3/14; B25H 3/00; B25H 3/02; B25H 3/021
USPC ................................ 296/37.6; 224/404, 42.4
See application file for complete search history.

(56) References Cited

U.S. PATENT DOCUMENTS

| | | | |
|---|---|---|---|
| 2,424,355 A | 7/1947 | Goldman et al. | |
| 2,978,153 A * | 4/1961 | Brindle | B60R 9/02 224/541 |
| 3,047,185 A * | 7/1962 | Lewis | B65F 1/141 220/630 |
| 3,602,376 A * | 8/1971 | Depiano | B65D 19/0002 248/346.02 |
| 4,126,349 A * | 11/1978 | Nelson | B60R 11/00 224/404 |

(Continued)

*Primary Examiner* — Justin M Larson
(74) *Attorney, Agent, or Firm* — Dunlap Bennett & Ludwig PLLC; Brendan E. Squire

(57) ABSTRACT

A removable and replaceable tool storage compartment apparatus including tool storage compartments and a compartment receiver. The tool storage compartments each include a frame, a plurality of panels coupled to the frame. A closure is configured to open and close an entrance to an inside of the tool storage compartment. The compartment receiver is configured to secure to a truck and support the tool storage compartment thereon. Lift mounts are coupled to the tool storage compartment and are used to remove the tool storage compartments from the truck. A lock is configured to lock the tool storage compartments to the compartment receiver and thereby lock the tool storage compartment to the truck.

7 Claims, 4 Drawing Sheets

(56) References Cited

U.S. PATENT DOCUMENTS

| | | | |
|---|---|---|---|
| 4,247,144 A | 1/1981 | Radek | |
| 4,249,295 A * | 2/1981 | Lance | B60R 11/06 29/416 |
| 4,274,568 A * | 6/1981 | Bott | B60R 9/065 220/629 |
| 4,847,928 A | 7/1989 | Fey | |
| 5,000,502 A | 3/1991 | Lyall | |
| 5,381,916 A * | 1/1995 | Strawder | B65D 21/0202 220/212 |
| 5,421,645 A * | 6/1995 | Young | B60R 11/06 296/37.6 |
| 5,460,304 A * | 10/1995 | Porter | B60R 9/06 224/485 |
| 5,617,696 A * | 4/1997 | Young | B60R 11/06 52/836 |
| 5,653,366 A * | 8/1997 | Liserre | B60R 7/02 220/481 |
| 5,687,895 A * | 11/1997 | Allison | B60R 7/02 220/23.4 |
| 5,785,372 A | 7/1998 | Glatzmeier et al. | |
| 5,924,616 A | 7/1999 | Shives | |
| 5,988,473 A | 11/1999 | Hagan et al. | |
| 6,099,070 A * | 8/2000 | Yocum | B62D 33/042 296/182.1 |
| 6,126,131 A * | 10/2000 | Tietz | B25H 3/00 108/55.3 |
| 6,139,081 A | 10/2000 | Lemieux | |
| 6,176,540 B1 * | 1/2001 | Whittaker | B60J 7/1621 296/100.01 |
| 6,375,054 B1 * | 4/2002 | Lance | B60P 3/14 224/404 |
| 6,422,629 B2 * | 7/2002 | Lance | B60R 11/00 224/403 |
| 6,524,040 B1 * | 2/2003 | Heil | B65D 19/0014 410/100 |
| 6,554,342 B1 * | 4/2003 | Burnett | B60P 3/14 211/70.6 |
| 6,626,480 B2 * | 9/2003 | Anderson | B60P 7/08 224/404 |
| 6,742,825 B1 * | 6/2004 | MacAulay | B60R 11/06 296/37.6 |
| 6,824,338 B2 * | 11/2004 | Looker | B60P 7/13 410/67 |
| 7,055,880 B2 | 6/2006 | Archer | |
| 7,070,227 B2 * | 7/2006 | Hunt | B60J 5/0497 296/183.1 |
| 7,156,273 B2 * | 1/2007 | Morris | B60R 9/06 108/14 |
| 7,367,571 B1 | 5/2008 | Nichols | |
| 7,661,685 B2 | 2/2010 | Thibault | |
| 7,726,719 B1 | 6/2010 | Barron | |
| 7,794,003 B2 * | 9/2010 | Crandall | B60R 9/00 224/403 |
| 8,061,572 B2 * | 11/2011 | Myrex | B60R 9/065 224/502 |
| 8,083,111 B2 * | 12/2011 | Lase | B60R 9/065 224/400 |
| 8,205,773 B2 * | 6/2012 | Timmer | B60R 9/065 220/628 |
| 8,668,209 B1 | 3/2014 | Anzivino et al. | |
| 8,820,598 B2 * | 9/2014 | Tennyson | B60R 9/065 224/509 |
| 8,960,468 B2 * | 2/2015 | Boivin | B65D 19/42 220/4.28 |
| 9,073,499 B1 | 7/2015 | Erickson | |
| 9,132,543 B2 * | 9/2015 | Bar-Erez | B25H 3/023 |
| 9,193,290 B2 * | 11/2015 | Lazarevich | B60P 3/14 |
| 9,216,698 B2 * | 12/2015 | Rhodes | B60R 9/065 |
| 9,623,550 B2 * | 4/2017 | Cole | A47B 45/00 |
| 9,724,819 B2 * | 8/2017 | Barry | B25H 3/006 |
| 9,969,414 B2 * | 5/2018 | Kelly | B62B 3/005 |
| 2003/0178868 A1 | 9/2003 | Lapsley | |
| 2010/0044369 A1 | 2/2010 | Toepfer et al. | |
| 2012/0267404 A1 * | 10/2012 | Rottinghaus | B60R 9/065 224/404 |
| 2014/0123478 A1 * | 5/2014 | Gylander | B25H 3/02 29/700 |
| 2019/0152409 A1 * | 5/2019 | Klatt | B60R 11/06 |

* cited by examiner

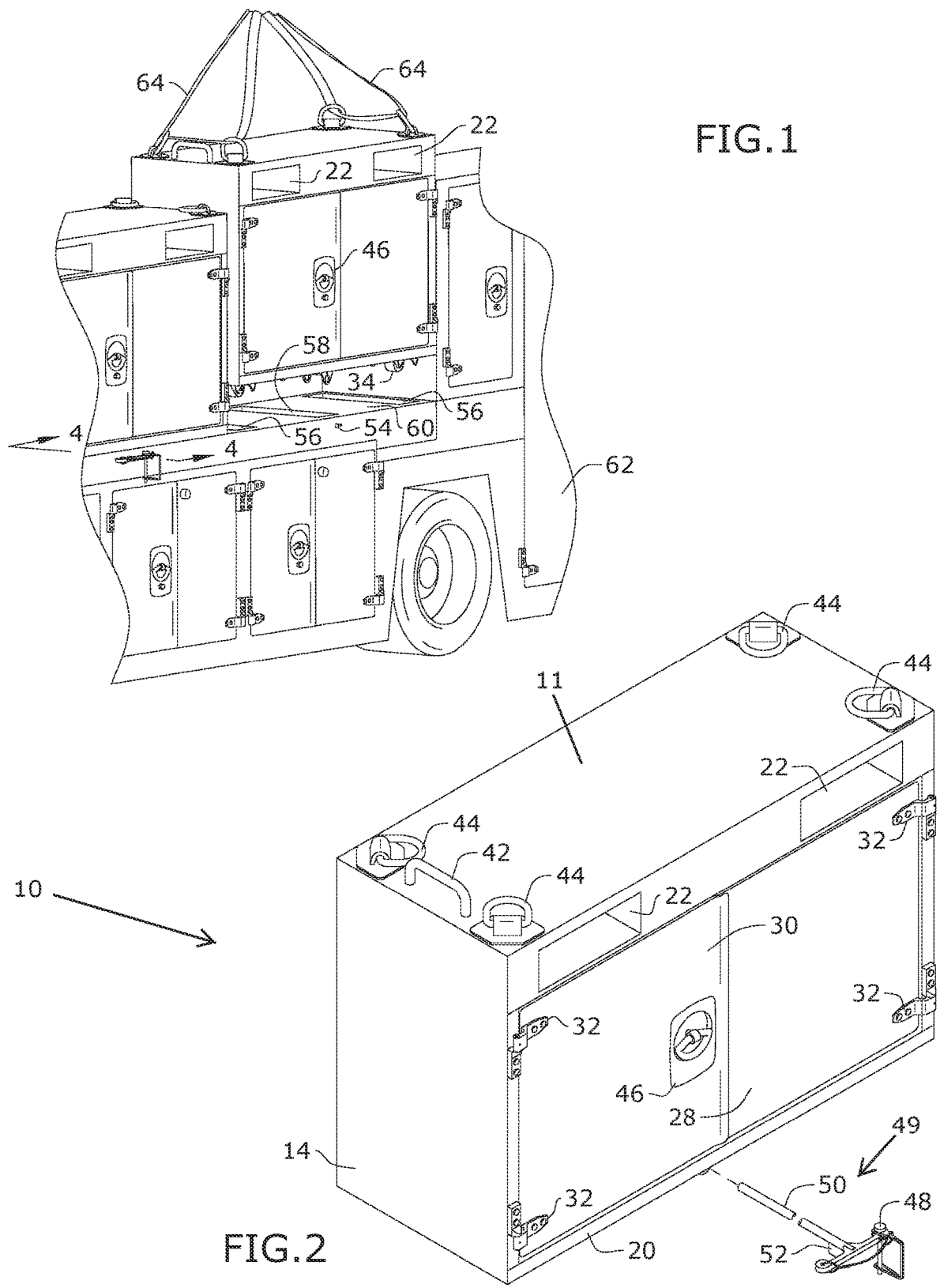

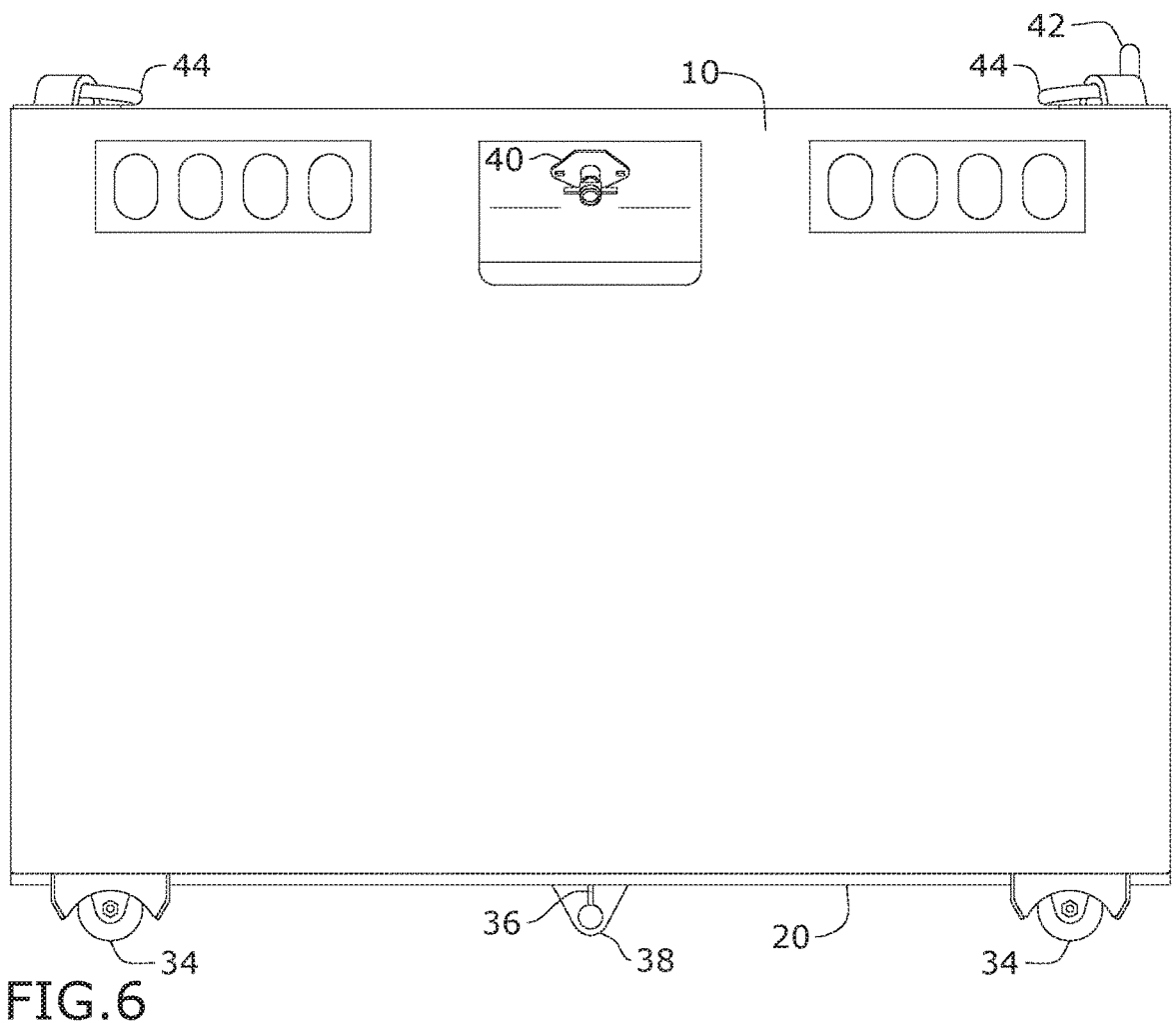
FIG.6
FIG.7
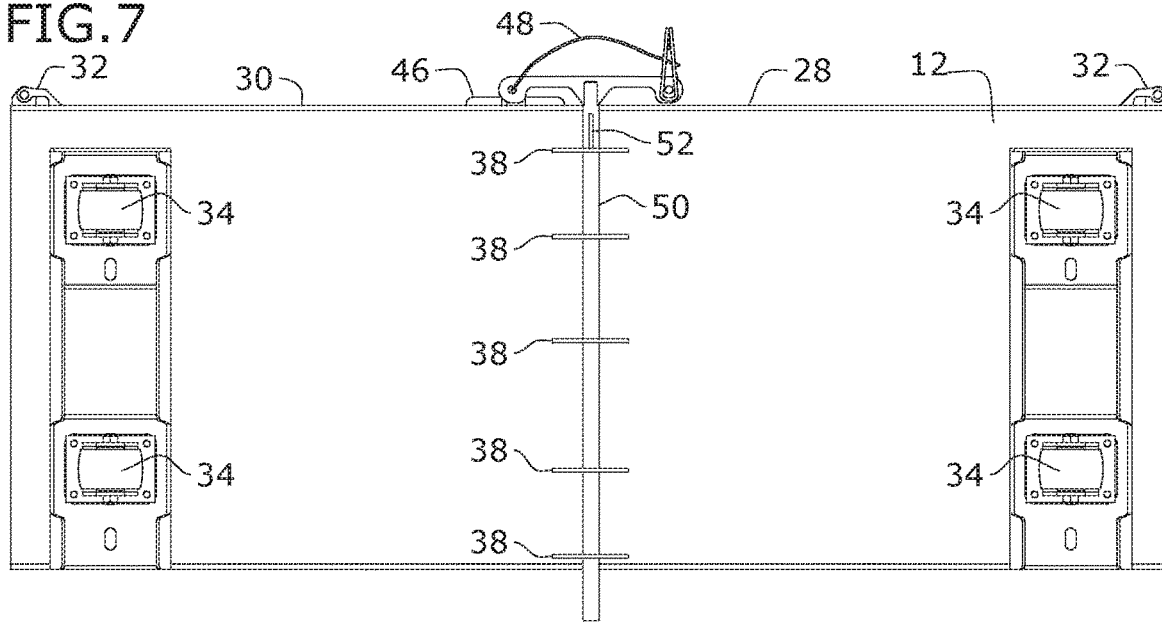

REMOVABLE TOOL STORAGE COMPARTMENT

CROSS-REFERENCE TO RELATED APPLICATION

This application claims the benefit of priority of U.S. provisional application No. 62/587,562, filed Nov. 17, 2017, the contents of which are herein incorporated by reference.

BACKGROUND OF THE INVENTION

The present invention relates to tool storage compartments and, more particularly, to tool storage compartments that are easily removable from a truck and replaceable.

Service trucks are often assigned to multiple mechanics who each have their own personal tools. At the end of each shift, the personal tools must be replaced on the truck for the next mechanic to use. Removing all the tools from the truck to switch them at the end of the shift is not practical. Leaving them on the vehicle does not allow the mechanic to have access to their tools if the truck is being used elsewhere. Current tool compartments are permanently attached, bolted on, or take significant time to remove.

As can be seen, there is a need for a removable toolbox compartment for mechanics to safely and quickly move their own tools from the truck to a facility location.

SUMMARY OF THE INVENTION

In one aspect of the present invention, a removable and replaceable tool storage compartment apparatus comprises: a tool storage compartment comprising: a frame; a plurality of panels coupled to the frame; a closure configured to open and close an entrance to an inside of the tool storage compartment; and lift mounts; a compartment receiver configured to secure to a truck and support the tool storage compartment thereon; and a locking mechanism configured to attach the tool storage compartment to the truck.

These and other features, aspects and advantages of the present invention will become better understood with reference to the following drawings, description and claims.

BRIEF DESCRIPTION OF THE DRAWINGS

FIG. 1 is a perspective view of an embodiment of the present invention shown in use;

FIG. 2 is a perspective view of an embodiment of the present invention;

FIG. 6 is a back view of an embodiment of the present invention; and

FIG. 7 is a bottom view of an embodiment of the present invention.

DETAILED DESCRIPTION OF THE INVENTION

Figure 3:
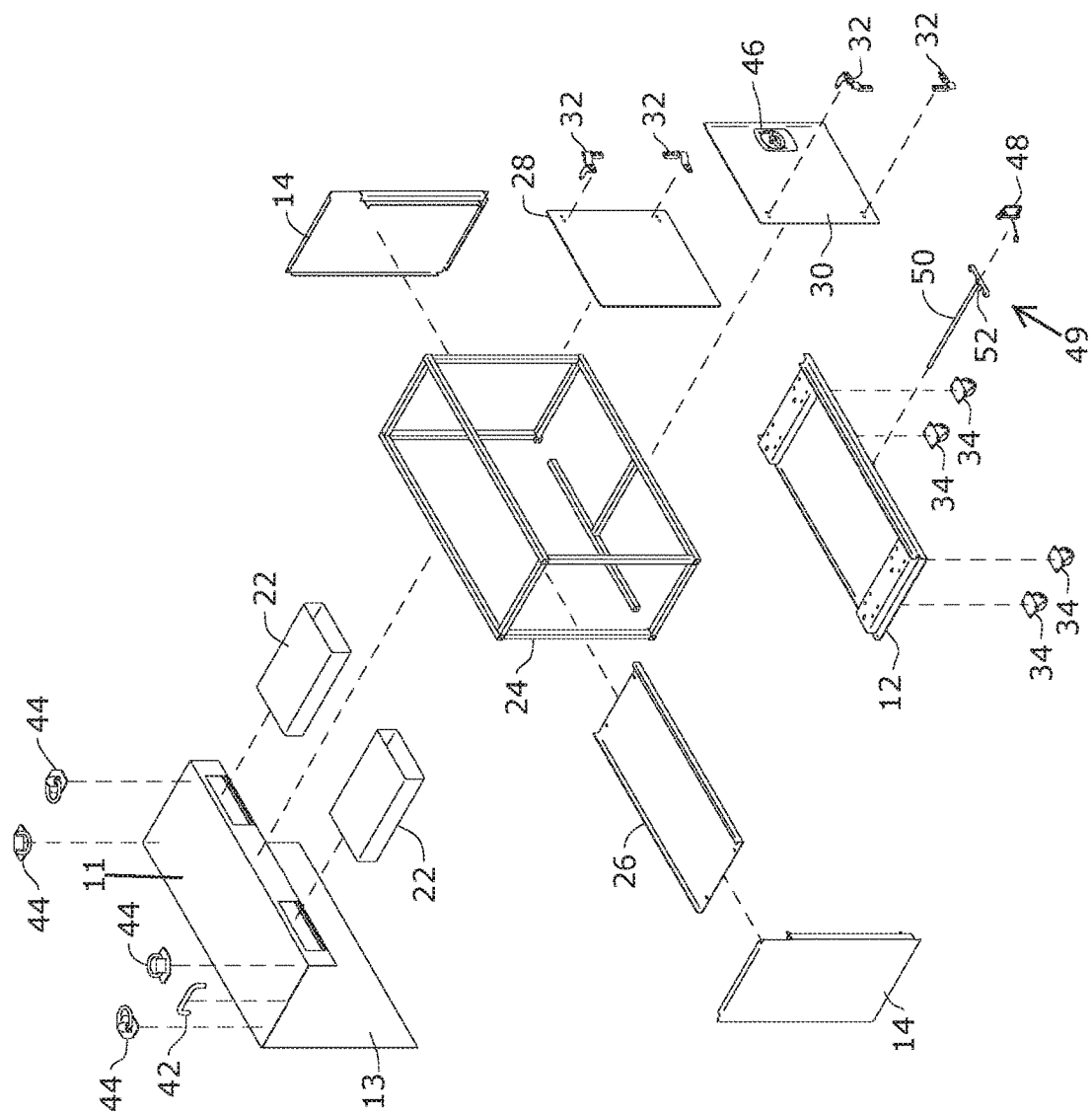
FIG. 3 is an exploded view of an embodiment of the present invention.
Figure 4:
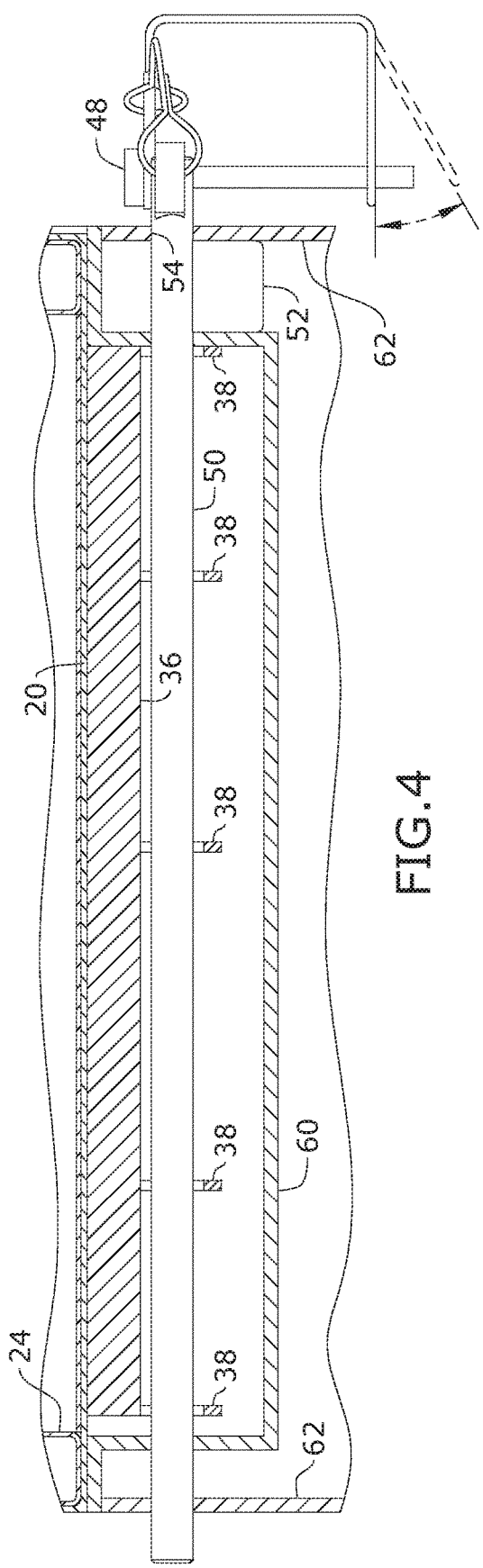
FIG. 4 is a section view of the present invention taken along line 4-4 in FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, one embodiment of the present invention is a removable tool compartment that attaches to a service truck, and is interchangeable with another compartment containing a different operator's personal tools when needed. Advantageously, the compartment includes casters on the bottom for transporting on the ground surface, and to be easily utilized off the vehicle.

Having dedicated trucks for each mechanic is a significant investment, versus having one truck for two mechanics on different shifts. Alternatively, having the mechanic load and unload his own tools from a shared truck is not an efficient use of time or money. Removable toolbox compartments allow the owner to have one service truck, and still have individual mechanics safely and quickly move their own tools from the truck to the fixed facility location.

The removable toolbox compartment can be loaded with an overhead hoist/crane, or a fork truck with the provided forklift pockets. In one embodiment, the compartment includes a "compartment not secure" light for the chassis cab, and interior compartment lighting for better tool visibility. Having casters on the bottom allows the operator to move the toolbox easily when not on the truck. The compartment is lockable so other users do not have access to the tools inside.

Referring to FIGS. 1 through 7, the present invention includes a removable and replaceable tool storage compartment apparatus including a plurality of tool storage compartments 10 and a compartment receiver 60. The tool storage compartments 10 each include a body made of a frame 24 and a plurality of panels 11, 12, 13, 14 coupled to the frame 24. A closure 28, 30 is configured to open and close an entrance to an inside of the tool storage compartment 10. The compartment receiver 60 is configured to secure to a truck 62 and support each of the tool storage compartments 10 thereon. Lift mounts 22, 44 are coupled to the tool storage compartments 10 and are used to install and remove the tool storage compartments 10 from the truck 62. A lock 49 is configured to attach the tool storage compartments 10 to the compartment receiver 60 and thereby attach the tool storage compartments 10 to the truck 62.

The tool storage compartments 10 contains tools. As mentioned above, a plurality of panels 11, 12, 13, 14 are coupled to the frame 24. The plurality of panels 11, 12, 13, 14 includes a top panel 11, a back panel 13, side panels 14, and a base panel 12. The closure 28, 30 may include a first door 28 and a second door 30 coupled to the frame 24 by hinges 32. At least one of the doors 28, 30 may include a handle 46. In certain embodiments, casters 34 are coupled to the base panel 12. The lift mounts 42, 44 may include lift rings 44, fork lift slots 22, or a combination thereof. The lifting rings 44 at the top and forklift slots 22 are used to remove or install the tool storage compartment 10 from the vehicle 62. Straps 64 may run through the lift rings 44. In one embodiment, the tool storage compartment 10 includes a handle 42 on the top panel 11 to make it easier to roll the compartment around on the casters 34.

In certain embodiments, the lock 49 includes a rod 50. A plurality of rod receivers 38 are coupled to and extend from the base panel 12. The plurality of rod receivers 38 include aligning openings sized to receive the rod 50. A plurality of rod openings 54 are defined by the compartment receiver 60. The rod 50 is disposed within the plurality of rod receivers 38 and the plurality of rod openings 54 in a locked position, thereby locking the tool storage compartment 10 to the compartment receiver 60. In certain embodiments, the rod 50 further includes a locking tab 52. A first rod opening 54 of the plurality of rod openings 54 includes a tab slot. The locking tab 52 is inserted through the tab slot and the rod 50 is rotated so that the locking tab 54 and the tab slot are unaligned in the locked position. A lock pin 48 is inserted to prevent the rod 50 from rotating in the locked position. A pad lock may be used instead of the lock pin 48. Other embodiments may include various locking mechanisms to secure the compartment 10 to the vehicle 62.

Figure 5:
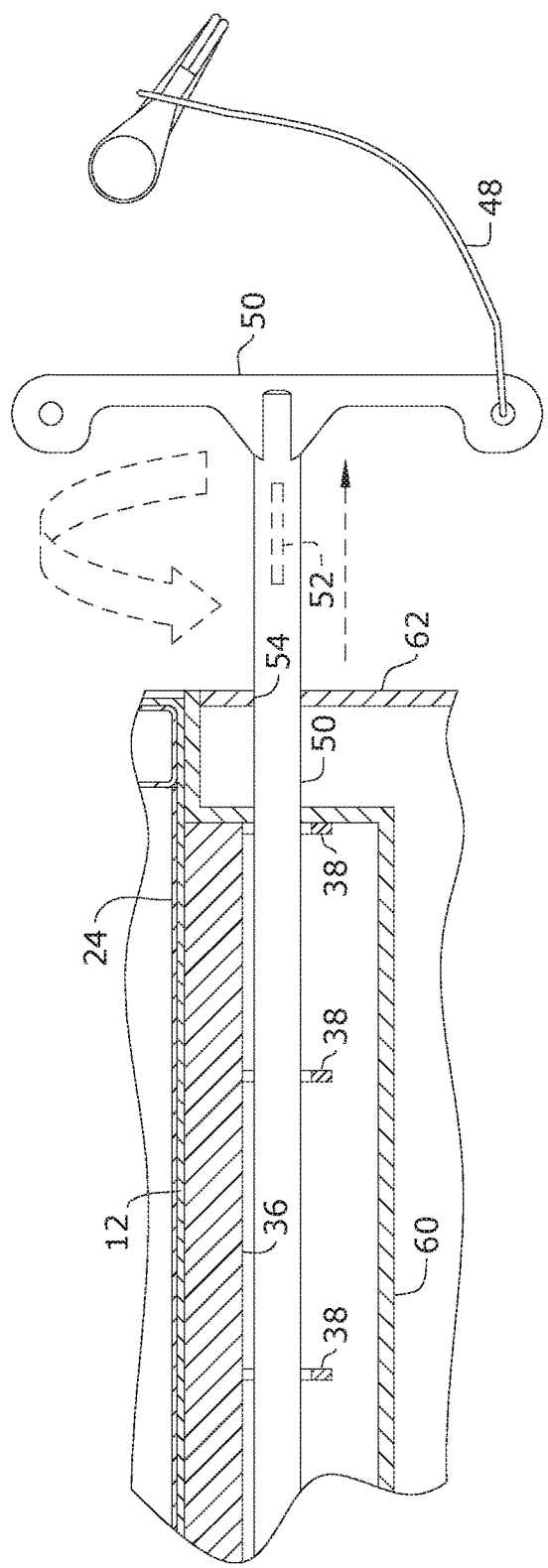
FIG. 5 is a section view of an embodiment of the present invention illustrating a removal of a lock.

In the embodiment of FIG. 5, the device is shown in an unlocked position with the lock pin 48 removed. When lock pin 48 is removed, the rod 50 is rotated 90° counterclockwise and removed in the direction of the arrow. This allows the compartment 10 to be removed from the service truck 62. To secure the compartment 10 to the compartment receiver 60, the rod 50 is installed and turned clockwise 90°, and the lock pin 48 is re-attached.

As mentioned above, the compartment receiver 60 may be fixed to the truck 62. The compartment receiver 60 may include wheel slots 56 sized and positioned to receive the casters 34. The compartment receiver 60 may further define a lock slot 58. The plurality of rod openings 54 align with the lock slot 58 and the plurality of rod receivers 38 extend into the lock slot 58 in the locked position.

Referring to FIG. 6, the back panel 13 may include a power connector 40. The tool storage compartments 10 can be connected to a power source to operate any lighting or other powered feature in the tool storage compartments 10. In one embodiment, the tool storage compartments 10 includes a sensor interface to alert the driver if the tool storage compartments 10 is not properly stowed.

In one embodiment of use, the service truck is loaded with company owned equipment in the rest of the truck's compartments. The removable toolbox compartment is loaded with the mechanic's personal tools. A second identical compartment is loaded with another mechanics personal tools. When the first mechanic is on shift, he uses an overhead lift or fork truck to load the first removable toolbox compartment, locking it to the service truck with the lock bar and provided pin or padlock. The second removable compartment is in the fixed facility for the mechanic to utilize. When the first mechanic's shift is done, he removes the compartment from the truck and places it on the ground to be used in the fixed facility, transporting by its own casters. The second mechanic then loads the second removable tool compartment onto the service truck. In alternative embodiments, the compartment is installed in other applications like boats, barges, the back of a pickup truck, or on a flatbed trailer.

In one embodiment of use, the service truck is loaded with job specific equipment in the removable toolbox compartment. Another removable compartment is loaded with equipment for another job. The compartment can be easily exchanged to facilitate different jobs.

It should be understood, of course, that the foregoing relates to exemplary embodiments of the invention and that modifications may be made without departing from the spirit and scope of the invention as set forth in the following claims.

What is claimed is:

1. A removable and replaceable tool storage compartment apparatus comprising:
   a tool storage compartment comprising:
      a body comprising a frame and a plurality of panels coupled to the frame, wherein the plurality of panels comprise a top panel, a back panel, side panels, and a base panel;
      a closure coupled to the body and configured to open and close an entrance to an inside of the tool storage compartment; and
      lift mounts;
   a compartment receiver configured to secure to a truck and support the tool storage compartment thereon; and
   a lock configured to attach the tool storage compartment to the compartment receiver, the lock comprising:
      a rod comprising a locking tab;
      a plurality of rod receivers coupled to and extending from the base panel, wherein the plurality of rod receivers comprise aligning openings sized to receive the rod; and
      a plurality of rod openings defined by the compartment receiver, wherein a first rod opening of the plurality of rod openings comprises a tab slot wherein
      the rod is disposed within the plurality of rod receivers and the plurality of rod openings, the locking tab is inserted through the tab slot, and the rod is rotated so that the locking tab and the tab slot are unaligned in a locked position.

2. The removable and replaceable tool storage apparatus of claim 1, wherein the closure comprises doors coupled to the frame by hinges.

3. The removable and replaceable tool storage apparatus of claim 1, further comprising casters coupled to the base panel.

4. The removable and replaceable tool storage apparatus of claim 3, wherein the compartment receiver comprises wheel slots sized to receiver the casters.

5. The removable and replaceable tool storage apparatus of claim 1, further comprising a lock pin configured to lock the rod from rotating in the locked position.

6. The removeable and replaceable tool storage apparatus of claim 1, wherein the compartment receiver defines a lock slot, wherein the plurality of rod openings align with the lock slot and the plurality of rod receivers extend into the lock slot.

7. The removeable and replaceable tool storage apparatus of claim 1, wherein the lift mounts comprises at least one of fork lift slots and lift rings.

\* \* \* \* \*